(12) United States Patent
Wold

(10) Patent No.: US 9,546,312 B2
(45) Date of Patent: Jan. 17, 2017

(54) ENDOTHERM SYSTEMS AND METHODS UTILIZING CARBOHYDRATE IN NON-OXIDIZING ENVIRONMENT

(75) Inventor: Claude Hayes Wold, San Diego, CA (US)

(73) Assignee: Hayes & Associates, San Diego, CA (US)

( * ) Notice: Subject to any disclaimer, the term of this patent is extended or adjusted under 35 U.S.C. 154(b) by 1459 days.

(21) Appl. No.: 12/200,503

(22) Filed: Aug. 28, 2008

(65) Prior Publication Data

US 2009/0059531 A1    Mar. 5, 2009

Related U.S. Application Data

(60) Provisional application No. 60/969,377, filed on Aug. 31, 2007.

(51) Int. Cl.
  *C09K 5/18*        (2006.01)
  *C09K 21/06*       (2006.01)

(52) U.S. Cl.
  CPC  *C09K 5/18* (2013.01); *C09K 21/06* (2013.01)

(58) Field of Classification Search
  CPC .................................. C09K 5/18; C09K 21/06
  USPC ................. 252/70, 75; 165/10, 17, 902, 905
  See application file for complete search history.

(56) References Cited

U.S. PATENT DOCUMENTS

| | | | |
|---|---|---|---|
| 1,310,841 A | | 7/1919 | Robinson |
| 1,860,097 A | | 5/1932 | Hoggatt |
| 1,879,128 A | | 9/1932 | Desper |
| 2,452,054 A | | 10/1948 | Jones et al. |
| 2,495,306 A | | 1/1950 | Zurcher |
| 2,648,641 A | | 8/1953 | Robison |
| 2,650,206 A | | 8/1953 | Stock |
| 2,881,088 A | * | 4/1959 | Schulenburg .............. 427/385.5 |
| 3,022,190 A | | 2/1962 | Feldman |
| 3,114,840 A | | 12/1963 | Johnston |
| 3,311,035 A | | 3/1967 | Poskey et al. |
| 3,438,847 A | | 4/1969 | Chase |
| 3,849,178 A | | 11/1974 | Feldman |
| 3,871,684 A | | 3/1975 | Staudacher et al. |
| 3,930,166 A | | 12/1975 | Bochard |
| 4,363,199 A | | 12/1982 | Kucheria et al. |
| 4,446,916 A | | 5/1984 | Hayes |
| 4,496,469 A | | 1/1985 | Morimoto et al. |
| 4,585,843 A | | 4/1986 | Flesher et al. |
| 4,600,634 A | | 7/1986 | Langer |
| 4,694,119 A | | 9/1987 | Groenewegen |
| 4,814,217 A | | 3/1989 | Kallstrom |
| 4,877,681 A | | 10/1989 | Hanada et al. |
| 5,047,449 A | | 9/1991 | Pastureau |
| 5,370,814 A | | 12/1994 | Salyer |
| 5,372,846 A | | 12/1994 | Feldman et al. |
| 5,438,162 A | | 8/1995 | Thompson et al. |
| 5,441,114 A | | 8/1995 | Spector et al. |
| 5,453,453 A | | 9/1995 | Lamon et al. |
| 5,477,917 A | | 12/1995 | Salyer |
| 5,750,925 A | | 5/1998 | Purdom |
| 5,804,294 A | | 9/1998 | Gregg et al. |
| 5,948,323 A | | 9/1999 | McLaughlin et al. |
| 6,045,718 A | | 4/2000 | Holman et al. |
| 6,793,844 B2 | * | 9/2004 | Hayes .............................. 252/70 |
| 6,899,161 B2 | | 5/2005 | Ren et al. |
| 2004/0208912 A1 | * | 10/2004 | Hayes .......................... 424/443 |

FOREIGN PATENT DOCUMENTS

| | | |
|---|---|---|
| DE | 2233107 | 1/1974 |
| DE | 3006733 | 9/1981 |
| GB | 2169146 | 7/1986 |
| WO | WO 2007/135355 | 11/2007 |

OTHER PUBLICATIONS

European Extended Search Report for Application No. 08828270.2 dated Mar. 24, 2014.
PCT International Search Report dated Nov. 19, 2008.

* cited by examiner

*Primary Examiner* — Amina Khan
(74) *Attorney, Agent, or Firm* — McCarter & English, LLP

(57) ABSTRACT

The increase of temperature in heat sensitive devices during heat generating conditions is prevented through the absorption of heat, by providing a carbohydrate endotherm in an amount sufficient to effect the required heat absorption. The carbohydrate endotherm operates in an environment substantially devoid of potential oxidizing reactants. A scavenger may be employed in combination with the carbohydrate endotherm to remove or neutralize potential oxidizing reactants. Alternatively (or in addition), a fluoro-inert material may be employed in combination with the carbohydrate endotherm to effect a desired non-oxidizing environment. The carbohydrate endotherm may be used to provide thermal control and/or thermal protection in a variety of applications and environments. The carbohydrate endotherm may also be employed in combination with previously disclosed endotherm materials to achieve synergistic benefits therewith.

12 Claims, No Drawings

ENDOTHERM SYSTEMS AND METHODS UTILIZING CARBOHYDRATE IN NON-OXIDIZING ENVIRONMENT

CROSS-REFERENCE TO RELATED APPLICATIONS

The present application is related to and claims priority benefit to a co-pending, commonly assigned provisional patent application entitled "ENDOTHERM SYSTEMS UTILIZING CARBOHYDRATE IN NON-OXIDIZING ENVIRONMENT," which was filed on Aug. 31, 2007 and assigned Ser. No. 60/969,377. The entire contents of the foregoing provisional patent application are incorporated herein by reference.

BACKGROUND

1. Technical Field

The present disclosure relates to endotherm systems and methods that employ one or more carbohydrates in a non-oxidizing (i.e., low oxygen) environment to absorb and/or dissipate heat from a potentially heat sensitive environment. Exemplary embodiments and implementations of the disclosed systems and methods employ one or more carbohydrates in combination with an oxygen scavenger to provide thermal control and/or thermal protection to heat sensitive devices and/or components, e.g., electrical devices and the like.

2. Background Art

Active cooling of electronic components, particularly delicate TR modules, Impatt diodes, data recorders, containers for chemicals and munitions, batteries and the like, is not always feasible. Even when feasible, active cooling generally requires continuous high energy cooling, which taxes other ancillary engineering systems typical in missiles, aircrafts, railroads, trucks, automobiles, guns, nuclear reactor systems, related combat systems, as well as commercial systems and technology.

The heat sinks of the prior art generally employ phase change material compositions (PCMs) for the absorption and dissipation of heat. Conventional PCM materials are largely solid or fluidic in nature, i.e. liquids, quasi-liquids or solids such as waxes or other meltable compositions. However, these conventional PCMs have proven to suffer from many technical problems, as well as problems in their use and application. These problems include relatively low latent heats of fusion, the inability to control the shape and form of such fluid PCM materials, as well as the unevenness of heating and cooling. Other problems include the need to provide a containment housing and the stress placed on the housing, resulting in frequent rupture and spillage of the PCM, potential hazards to life and property due to high heat content and flammability of conventional PCMs, and uneven cooling hysteresis. In addition, the use of such known PCMs can lead to spillage of hot fluids onto a human's skin, resulting in serious third degree burns due to the sticky contact nature of many hot wax and polymer or plastic PCMs. Ruptured non-composite fabric endothermic material (CFEM) or liquefied bulk PCM disks may spill their content and cause flash fires, which have a tendency to spread as the PCM pours out during heating in ovens Moreover, wax-filled disks are prone to fires which can spread and flow out of stoves.

Applicant has addressed some of these and other PCM problems in his U.S. Pat. No. 4,446,916, disclosing composite fabric endothermic materials (CFEMs) and providing devices especially suitable for use as heat sinks for aerospace and military use. The disclosed CFEMs provide an improved heat sink that absorbs heat at the melting temperature of a compound embedded within a fibrous mesh or matrix. The CFEM preferably includes a phase change material which is held by capillary action and chemical adhesion to the fibers of the matrix. As a result, a greatly increased surface area for heat transfer is obtained, thus providing for controlled melting and thermal dissipation of the fusion cooling agent.

Applicant has also addressed some of the PCM problems in U.S. Pat. No. 5,709,914, which addresses the need for an improved recyclable endothermic/exothermic thermal storage method for use in many commercial and civilian applications, e.g., in food, home and commercial packaging operations. In the '914 patent, improved CFEMs are disclosed that are capable of being employed in a variety of commercial applications, such as in the food industry, where a need has arisen for heat retaining or heat insulating containers, packages and thermal storage devices. However, the active agents disclosed in the '914 patent are not useful in certain heat absorbing devices, as they function simultaneously as endotherms and exotherms. While the agents disclosed in the '914 patent can accomplish some protection from high temperatures through absorption of their latent heat of fusion, such agents are totally unsuitable for applications relating to the absolute protection of heat sensitive devices from high heat. After all, the heat they have absorbed, they must release. In addition, the active agents of the '914 Patent and other prior art PCMs are not capable of absorbing more than 130 cal/gm. Thus, they can remove heat for only a short period of time relative to mass and only at temperatures not exceeding 326° F. Consequently, they are not effective for applications requiring cooling at very high temperatures and for long periods of time as would be needed, for example, in airplane and railroad crash recorders, missile electronics, spacecraft devices, power supplies, data recorders employed as aircraft and railroad components and combat devices, and in commercial uses such as oven sensors, fire walls, nuclear reactors, munitions' boxes, chemical containers, batteries and automobile exhaust systems. Finally, the agents disclosed in the '914 patent tend to burn at relatively high temperatures, raising the overall heat content of the system.

More recently, applicant has issued a series of patents directed to advantageous endotherm systems that provide non-reversible heat absorbing applications. For example, applicant has disclosed heat absorbing devices and methods capable of absorbing heat for the cooling and maintenance of the temperature of heat sensitive devices at acceptable levels. [See U.S. Pat. Nos. 6,793,844; 6,780,345; 6,773,623; 6,759,476; 6,673,260; 6,652,770; 6,638,444; 6,558,568; 6,264,854; 6,261,475; 6,241,910; 6,241,909; 6,238,591; 6,235,216; and 6,224,784; the contents of the foregoing U.S. patents are incorporated herein by reference.] The disclosed endothermic agents include certain acids and their salts, certain bases and their salts, certain hydrate salts and certain organic compounds. The disclosed endothermic agents are effective in absorbing large quantities of heat to decompose to their individual component elements at temperatures specific to such agents. Additional heat may be absorbed by the disclosed endothermic agents, e.g., in connection with phase change phenomena and/or dehydration. Exemplary endotherms include boric acid; metal hydroxides and their mixtures; carbonates and bicarbonates and their mixtures; salts of acetic acid, salts of formic acid, salts of boric acid and their mixtures; paraldehyde, paraformaldehyde and trioxane and their mixtures; and hydrate salts and their mixtures. The endothermic systems and methods disclosed in these prior patents are effective and have been utilized in commercial systems to achieve desired levels of thermal control and/or thermal protection.

Nonetheless, a need remains for improved systems and methods for providing thermal control and/or thermal protection, e.g., for electronic devices and the like. The need extends to the thermal protection of various heat sensitive devices, such as airplane and railroad crash recorders, missile electronics, munitions boxes, clothing, firewalls, safe boxes, nuclear reactors, laser shields, thermal pulse shields, spacecraft devices, power supplies, data recorders employed as aircraft and railroad components, combat devices, as well as in commercial uses such as oven sensors and the like. These and other needs are satisfied by the systems and methods disclosed herein, as well be apparent to persons of skill in the art from the disclosure that follows.

SUMMARY OF INVENTION

According to the present invention, a method for providing thermal protection to a heat sensitive device is provided. According to the disclosed method, an amount of a carbohydrate endotherm sufficient to effect the required heat absorption may be provided. Optionally, oxygen scavenger in proximity to the carbohydrate may also be provided. The carbohydrate endotherm and the oxygen scavenger may be placed in proximity to the heat sensitive device, and the oxygen scavenger may establish a substantially non-oxidizing environment in the vicinity of the carbohydrate endotherm. The carbohydrate endotherm may cause a desired level of heat absorption in order to provide thermal protection to the heat sensitive device at least in part based on irreversible decomposition.

A further illustrative method for providing thermal protection to a heat sensitive device according to the present invention may provide an amount of a carbohydrate endotherm sufficient to effect a desired amount of heat absorption. The carbohydrate endotherm may be placed in proximity to a heat sensitive device in a substantially non-oxidizing environment. The carbohydrate endotherm may cause desired level of heat absorption to provide thermal protection to the heat sensitive device at least in part based on irreversible decomposition.

A system for providing thermal protection to a heat sensitive device is also provided. The system may include a support in proximity to a heat sensitive device. The system may include carbohydrate endotherm in a substantially non-oxidizing environment, where the carbohydrate endotherm may be adapted to provide thermal protection to the heat sensitive device at least in part based on irreversible decomposition.

DESCRIPTION OF EXEMPLARY EMBODIMENT(S)

According to the present disclosure, advantageous endotherm systems and methods are provided that offer thermal control and/or thermal protection in various applications and implementations. According to exemplary embodiments/implementations of the present disclosure, the endotherm system includes a carbohydrate that is operative in an environment that is substantially devoid of potential oxidizing reactants, e.g., oxygen. The non-oxidizing environment may be provided in a variety of ways. For example, the disclosed endotherm system may be positioned within or otherwise encased by a sealed vessel/container, wherein the inner volume of such vessel/container is substantially devoid of oxidizing reactants. Alternatively (or in addition), a scavenger may be included with the carbohydrate endotherm, e.g., an oxygen scavenger, to address any potential oxidizing sources otherwise present in the operative embodiment. Still further, a non-oxidizing environment may be established by immersing the disclosed carbohydrate endotherm in an inert environment, e.g., a fluoro-inert liquid or solid, that isolates the decomposing carbohydrate from potential oxidizing reactants. Thus, the disclosed carbohydrate endotherms are well suited for applications/implementations that involve hermetically sealed structures and for applications/implementations in outer space.

Thus, in a first exemplary implementation of the disclosed system/method, a carbohydrate endotherm may be positioned in the inner volume of a vessel/container and a vacuum may be applied to such inner volume so as to substantially withdraw the gaseous content thereof. Once the potential oxidizing airspace is removed from the inner volume of the vessel/container, a vacuum may be maintained and/or an inert gas (e.g., nitrogen) may be introduced to the inner volume. In exemplary embodiments, a vacuum condition is thus established in the vessel/container to minimize the potential for oxidizing effects therewithin.

In a second exemplary implementation of the disclosed system/method, a carbohydrate endotherm and a scavenger that is adapted to scavenge/neutralize potential oxidizing reactants are employed in combination. In such exemplary implementations, the scavenger may take the form of a homogeneous composition/material, e.g., boron or boric acid, or may take the form of a mixture or blend of different scavenger compositions/materials. In either case, the scavenger is generally included in the overall system at a level sufficient to reduce the potential for undesirable oxidation reactions that would negatively impact the thermal control and/or thermal protection properties of the carbohydrate. In certain implementations, the oxygen scavenger may itself further function as an endotherm, as is the case, for example, with boric acid. [See, e.g., U.S. Pat. No. 6,793,844 to Hayes; previously incorporated herein by reference.]

The carbohydrate and oxygen scavenger compositions may be combined in a variety of ways according to the present disclosure. Thus, in a first exemplary embodiment, the carbohydrate may be embedded (in whole or in part) in an oxygen scavenger to provide an advantageous endotherm composition. Conversely, an oxygen scavenger may be embedded (in whole or in part) in a carbohydrate to provide an advantageous endotherm composition. Alternative configurations and assemblies may be employed such that the carbohydrate and the oxygen scavenger are substantially juxtaposed, thereby realizing the beneficial attributes of both such materials/constituents. And, as noted above, the oxygen scavenger may fulfill additional functions in the disclosed combination, e.g., by acting as an endotherm in its own right.

The carbohydrate endotherm may take various forms as well. For example, the carbohydrate endotherm may take the form of a sugar, a starch, cellulose and combinations/mixtures thereof. The disclosed carbohydrate endotherms offer advantageous thermal control and/or thermal protection properties because, in response to heat input in a non-oxidizing (i.e., low oxygen or oxygen free) environment, the carbohydrate endotherm decomposes, thereby absorbing substantial amounts of heat from the surrounding environment. Indeed, a carbohydrate endotherm (e.g., sugar, starch, cellulose and the like) functions as an excellent decomposition agent suitable for non-oxidized thermal decomposition and thereby functions as an endothermic chemical means for temperature control and/or thermal protection. For the carbohydrate endotherm systems and methods of the present disclosure, carbohydrate mixtures may prove most effective in certain applications and/or implementations, e.g., for applications/implementations where a decomposition response is desired over a range of heat input levels. In such circumstances, carbohydrate endotherms may be provided that include a blend of carbohydrates offering varying latent heat of decomposition properties. As described herein, the non-oxidizing environment within which the disclosed carbohydrate endotherm operates may be achieved in various ways, e.g., based on the presence of an oxygen scavenger, based on immersion in a fluoro-inert system (e.g., a perfluorocarbon material), and/or based on positioning in a non-oxidizing environment.

Generally, the end product of the decomposition of a carbohydrate endotherm in a non-oxidizing environment will be carbon and water. Indeed, as shown in Formula I hereinbelow, for decomposition of sucrose (a common sugar) in a non-oxidizing environment, the products are limited to carbon and water.

$$C_{12}H_{22}O_{11} + \text{heat} \rightarrow 12\ C + 11\ H_2O \quad (I)$$

Of note, in implementations of the disclosed system and method that employ a scavenger, the end products may be influenced by such scavenger. For example, in systems/methods that employ boric acid as a scavenger, the end products are typically carbon, water and boron oxide. The carbohydrate endotherm advantageously undergoes an irreversible decomposition in response to a threshold heat input level. As such, the potential for return of the heat to the environment is beneficially eliminated, thereby providing desired levels of thermal protection to such environment, e.g., to electrical devices and the like. In addition, the scavenger may provide further endothermic functionality, e.g., through irreversible decomposition at a threshold temperature based on the requisite energy input. Thus, the disclosed endothermic systems/methods may include a blend of carbohydrate(s) and one or more scavengers (one or more of which may also function as endotherms).

Additional/ancillary temperature control mechanisms may be included in the disclosed endotherm system/method. For example, mechanical and/or physical phase change cooling effects may be realized (in addition to decomposition of the carbohydrate endotherm in a non-oxidizing environment and potential decomposition of an associated oxygen scavenger), e.g., vaporization of water formed through decomposition of the carbohydrate endotherm. Thus, the structure, design and operation of the thermal control system disclosed herein may be advantageously adapted to permit and/or facilitate such ancillary heat exchange/absorption mechanisms.

The disclosed carbohydrate endotherms may be employed in combination with endothermic materials/compositions that have been previously disclosed by the present application. For example, the disclosed carbohydrate endotherms may be employed in a non-oxidizing environment together with one or more of the following materials/compositions that have been previously disclosed: (i) certain acids and their salts, (ii) certain bases and their salts, (iii) certain hydrate salts, and (iv) certain organic compounds. The combination of the newly disclosed carbohydrate endotherms and the previously disclosed endotherms offer wide ranging thermal control and thermal protection properties that are operative over a range of temperatures and potential heat sink requirements. Indeed, synergistic results may be achieved by combining the disclosed carbohydrate, oxygen scavenger and one or more of the previously disclosed endothermic materials disclosed in applicant's prior U.S. patents, i.e., U.S. Pat. Nos. 6,793,844; 6,780,345; 6,773,623; 6,759,476; 6,673,260; 6,652,770; 6,638,444; 6,558,568; 6,264,854; 6,261,475; 6,241,910; 6,241,909; 6,238,591; 6,235,216; and 6,224,784 (the contents of which were previously incorporated by reference). Moreover, one or more of the disclosed non-carbohydrate endotherms may function, at least in part, as an oxygen scavenger, thereby supporting the endothermic functionality of the disclosed carbohydrate endotherms.

As with the present applicant's prior endotherm-related patents, the shape, size and physical characteristics of the heat absorbing devices and the steps of the heat absorbing methods are generally dictated by various factors, e.g., the type of heat sensitive device being protected, the heat sensitive device's spatial limitations, the heat sensitive device's physical environment and the heat generating conditions to which the heat sensitive device will be subjected. Similarly, the type and the amount of carbohydrate endotherm used in combination with the heat absorbing device are generally dictated by a variety of factors, e.g., the heat sensitivity of the heat sensitive device, the maximum temperature at which the heat sensitive device can continue to be viable, the extreme temperatures to which the heat sensitive device will ultimately be subjected, the time duration over which the heat sensitive device will be exposed to heat generating conditions, and the total thermal flux or thermal load to which the heat sensitive device will be subjected.

In exemplary embodiments of the disclosed system and method, the carbohydrate endotherms (and any ancillary endothermic materials) can be supported within or with respect to a device via a retaining matrix, packaging, encapsulation, microencapsulation, enclosure or structure to form a heat absorbing surface, device or structure. In embodiments that include a scavenger to ensure a non-oxidizing environment, the scavenger may be similarly supported within or with respect to a device via a retaining matrix, packaging, encapsulation, microencapsulation, enclosure or structure to form a heat absorbing surface, device or structure. Heat sensitive devices to be protected and/or to benefit from temperature control based on the disclosed carbohydrate endotherm can be placed in juxtaposition with the carbohydrate endotherm (and the scavenger, if applicable). For example, the heat sensitive device can be (i) embedded within the carbohydrate endotherm; (ii) surrounded by the carbohydrate endotherm; (iii) positioned within a closed vessel/container with the carbohydrate endotherm lining the walls (inner or outer) of the vessel/container; or (iv) positioned in proximity to a carbohydrate endotherm that is adhered to a substrate (flexible or non-flexible) capable of being adapted to the size and shape necessary for use with the heat sensitive device.

The disclosed carbohydrate endotherms are generally extremely stable in diverse environments, have long shelf life and high latent heats of decomposition. Generally, the inventive method involves taking an amount of carbohydrate endotherm sufficient to effect a desired level of heat absorption and either contacting the endotherm to the heat sensitive device or supporting the carbohydrate endotherm between the heat sensitive device and the heat generator so as to absorb the heat and prevent any substantial increase in the temperature of the heat sensitive device.

In an exemplary application of the disclosed carbohydrate endotherm, a flight data recorder is provided with a heat absorbing shield. The shield is in essence a single, flat, rectangular block very similar to a small brick. It is sized in length, height and width so that it could lie right up against and contact the surface of the flight data recorder circuit board, which requires protection. The shield consists of wafers of a carbohydrate endotherm, e.g., a sugar, starch or cellulose, held together and retained with metal or plastic. The carbohydrate endotherm shield is then laid up against the circuit board of the memory control system of the flight data recorder and provides desired heat sink properties, when and as needed.

Other exemplary applications of the disclosed carbohydrate endotherms operative in a non-oxidizing environment include, by way of example and not as a limitation: temperature control coatings, wraps and liners, as well as thermal protection for metal and plastic structures; cooling for electronics, oven sensors, missile skins, exhaust pipes, thermal protection in race cars, fire walls, emergency cooling for nuclear reactors, guns, munitions boxes, batteries and related equipment; and in structures designed to shield life from thermal harm.

All of the carbohydrate endotherms and potential scavenger systems are commercially available and relatively inexpensive. They may be easily incorporated in and integrated in CFEMs, metal mesh matrices, silicon or carbon fiber or microencapsulated in porous silicate, porous carbon bodies, or suspended in plastics, such as fluoroelastomers, Teflon, metals or other materials. The carbohydrate endotherm agents may be shaped in the form of enclosures, chips, or cakes which can be incorporated in shaped bodies and, thus, can be formed in shape and dimension as required. In some applications, the carbohydrate endotherm agents and/or scavengers may be formed into gels and pastes.

The disclosed carbohydrate endotherms provide advantageous functionalities in that they readily absorb massive quantities of heat in a unidirectional reaction and, once they absorb such heat, they do not release it, they do not reverse, and therefore cannot act as heat generating compounds. Thus, protection for heat sensitive devices is significant and substantial within a non-oxidizing environment. Furthermore, the disclosed carbohydrate endotherms produce environmentally harmless products (e.g., carbon and water) during decomposition, even at elevated temperatures.

Various modifications and changes have been disclosed herein, and others will be apparent to those skilled in this art. Therefore, it is to be understood that the present disclosure is by way of illustration an not limitation of the present invention.

The invention claimed is:

1. A method for providing thermal protection to a heat sensitive device comprising the steps of:
   (a) providing an amount of a carbohydrate endotherm sufficient to effect the required heat absorption, wherein the carbohydrate endotherm is selected from the group consisting of at least one of a sugar and a starch;
   (b) providing an oxygen scavenger in proximity to the carbohydrate;
   (c) positioning the carbohydrate endotherm and the oxygen scavenger in proximity to the heat sensitive device, the oxygen scavenger being effective to establish a substantially non-oxidizing environment in the vicinity of the carbohydrate endotherm; and
   (d) allowing the carbohydrate endotherm to effect a desired level of heat absorption to provide thermal protection to the heat sensitive device at least in part based on irreversible decomposition.

2. A method for providing thermal protection to a heat sensitive device comprising the steps of:
   (a) providing an amount of a carbohydrate endotherm sufficient to effect the required heat absorption, wherein the carbohydrate endotherm is selected from the group consisting of at least one of a sugar and a starch;
   (b) positioning the carbohydrate endotherm in proximity to the heat sensitive device in a substantially non-oxidizing environment; and
   (c) allowing the carbohydrate endotherm to effect a desired level of heat absorption to provide thermal protection to the heat sensitive device at least in part based on irreversible decomposition.

3. The method of claim 2, wherein the substantially non-oxidizing environment is effected through the presence of an oxygen scavenger.

4. The method of claim 2, wherein the non-oxidizing environment is effected by positioning the carbohydrate in a container or vessel that is substantially devoid of oxidizing reactants.

5. The method of claim 4, wherein oxidizing reactants are removed from the container or vessel by applying a vacuum.

6. The method of claim 2, wherein the non-oxidizing environment is effected by positioning the carbohydrate in a fluoro-inert material.

7. The method of claim 2, wherein the heat sensitive device includes electronics.

8. The method of claim 2, wherein the heat sensitive device is a flight data recorder.

9. The method of claim 3, wherein the carbohydrate endotherm is embedded at least in part in the oxygen scavenger.

10. The method of claim 3, wherein the oxygen scavenger is embedded at least in part in the carbohydrate endotherm.

11. The method according to claim 2, further comprising adding at least one additional endothermic material selected from the group consisting of an acid, a salt of an acid, a base material, a salt of a base material, and a hydrate salt with an organic compound.

12. The method according to claim 2, wherein the substantially non-oxidizing environment is provided by a scavenger, and wherein the scavenger also functions as an endotherm.

* * * * *